United States Patent
Li et al.

(10) Patent No.: US 8,416,373 B2
(45) Date of Patent: Apr. 9, 2013

(54) DISPLAY DEVICE AND METHOD FOR MANUFACTURING THE SAME

(75) Inventors: Yuet-Wing Li, Tainan (TW);
Chien-Tang Wang, Tainan (TW);
Kuan-Hsu Fan-Chiang, Tainan (TW)

(73) Assignee: Himax Display, Inc., Tainan (TW)

( * ) Notice: Subject to any disclaimer, the term of this patent is extended or adjusted under 35 U.S.C. 154(b) by 35 days.

(21) Appl. No.: 13/192,855

(22) Filed: Jul. 28, 2011

(65) Prior Publication Data
US 2012/0257149 A1    Oct. 11, 2012

Related U.S. Application Data

(60) Provisional application No. 61/472,621, filed on Apr. 6, 2011.

(51) Int. Cl.
*G02F 1/1335*    (2006.01)

(52) U.S. Cl. ........................................ 349/106; 349/114

(58) Field of Classification Search .................. 349/106, 349/114
See application file for complete search history.

(56) References Cited

U.S. PATENT DOCUMENTS

| | | | |
|---|---|---|---|
| 5,317,437 A * | 5/1994 | Katakura | 349/144 |
| 7,139,049 B2 | 11/2006 | Yoshida | |
| 7,369,195 B2 | 5/2008 | Wu et al. | |
| 7,990,056 B2 * | 8/2011 | Mourey | 313/506 |
| 2006/0109412 A1* | 5/2006 | Hsiao et al. | 349/146 |
| 2006/0274243 A1* | 12/2006 | Iijima et al. | 349/114 |
| 2012/0154722 A1* | 6/2012 | Kang et al. | 349/106 |

* cited by examiner

*Primary Examiner* — Huyen Ngo
(74) *Attorney, Agent, or Firm* — J.C. Patents

(57) ABSTRACT

A display device and a method for manufacturing the display device are provided. The display device includes a substrate and a color filter layer. A plurality of sub-pixel electrodes are formed on the substrate. The color filter layer is configured on the substrate. The color filter layer defines a plurality of color areas corresponding to the sub-pixel electrodes. Here, each of the color areas is partially overlapped with two of the sub-pixel electrodes adjacent to each other.

7 Claims, 11 Drawing Sheets

DISPLAY DEVICE AND METHOD FOR MANUFACTURING THE SAME

CROSS-REFERENCE TO RELATED APPLICATION

This application claims the priority benefit of U.S. Provisional Application Ser. No. 61/472,621, filed Apr. 6, 2011. The entirety of the above-mentioned patent application is hereby incorporated by reference herein and made a part of this specification.

BACKGROUND OF THE INVENTION

1. Field of the Invention

The invention relates to a display device. More particularly, the invention relates to a display device having a color filter layer and a method for manufacturing the display device.

2. Description of Related Art

The performance of a display device is often subject to a fringe field effect (FFE). Specifically, when the density of sub-pixels is high, or the distance between two adjacent sub-pixels is close, the FFE needs to be taken into consideration. In an exemplary liquid crystal on silicon (LCOS) display device, the density of the sub-pixels is high, and the distance between the adjacent sub-pixels is short. Hence, the FFE on the sub-pixels results in light leakage between the adjacent sub-pixels. FIG. 1A is a schematic partial top view illustrating a sub-pixel array in a conventional display device 100. FIG. 1B is a schematic explosive view illustrating the sub-pixel array depicted in FIG. 1A. With reference to FIG. 1A and FIG. 1B, the display device 100 includes a color filter layer 110, a sub-pixel electrode layer 120, a liquid crystal layer 130, a transparent electrode layer 140, and a substrate 150. The electrode layers 120 and 140 are configured on the substrate 150. The liquid crystal layer 130 is configured between the electrode layers 120 and 140. The color filter layer 110 is configured between the sub-pixel electrode layers 120 and the liquid crystal layer 130.

The material of the transparent electrode layer 140 is any transparent conductive material, e.g., indium-tin oxide (ITO). The sub-pixel electrode layer 120 has a plurality of sub-pixel electrodes (e.g., sub-pixel electrodes 121, 122, and 123). The conventional color filter layer 110 has a plurality of color areas (e.g., color areas 111, 112, and 113). The shape and the location of the color areas in the conventional color filter layer 110 are the same as the shape and the location of the corresponding sub-pixel electrodes in the sub-pixel electrode layer 120. For instance, the color area 112 and the sub-pixel electrode 122 are rectangular, and the color area 112 merely covers the sub-pixel electrode 122. The color area 112 does not cover the sub-pixel electrodes (e.g., the sub-pixel electrodes 121 and 123) adjacent to the sub-pixel electrode 122.

The electric field between the sub-pixel electrode 122 and the transparent electrode layer 140 can drive the corresponding liquid crystal in a region on the liquid crystal layer 130, so as to change the light transmission rate of the corresponding region containing liquid crystal. Theoretically, the ideal electric field between the sub-pixel electrode 122 and the transparent electrode layer 140 affects the liquid crystal in the region where the sub-pixel electrode 122 is located (i.e., the region where the color area 112 is located) but does not affect the liquid crystal in the region (hereinafter "liquid crystal region") where the adjacent sub-pixel electrodes (e.g., the sub-pixel electrodes 121 and 123) are located. However, practically speaking, the range of the fringe field distribution (i.e., the range of the electric field distribution) of the sub-pixel electrode 122 in the sub-pixel array is overlapped with the liquid crystal region where the adjacent sub-pixel electrodes are located. For instance, the fringe field distribution range of the sub-pixel electrode 122 is represented by a dotted line 10 in FIG. 1A. A partial area 11 within the fringe field distribution range 10 is overlapped with the liquid crystal region where the adjacent sub-pixel electrode 121 is located, and another partial area 13 within the fringe field distribution range 10 is overlapped with the liquid crystal region where the adjacent sub-pixel electrode 123 is located. This is the so-called FFE.

It is assumed that the color areas 111, 112, and 113 are red, green, and blue areas. The fringe field distribution range 10 shown in FIG. 1A allows the sub-pixel in the color area 112 to display green light; the partial area 11 within the fringe field distribution range 10 may have red light leakage at the color area 111; the partial area 13 within the fringe field distribution range 10 may have blue light leakage at the color area 113. Apparently, the FFE on the sub-pixels leads to unexpected color light leakage, which is detrimental to the display performance of the display device 100.

FIG. 2 is a schematic partial top view illustrating a sub-pixel array in a conventional display device 200. The description of the display device 200 in FIG. 2 can be referred to as the description of the display device 100 in FIG. 1. The difference between the display device 100 and the display device 200 lies in that the area of the sub-pixel electrodes in the display device 200 is reduced. For instance, the upper-right and lower-left corners of the sub-pixel electrode 122 are cut, as indicated in FIG. 2. Thereby, the fringe field distribution range of the sub-pixel electrode 122 can be modified, such that the modified fringe field distribution range of the sub-pixel electrode 122 conforms to the shape of the color area 112. As such, the conventional issue of FFE has been resolved. Nonetheless, the reduction of the area of the sub-pixel electrode leads to the decrease in both the aperture ratio of the sub-pixel and the maximum display brightness of the display device 100.

SUMMARY OF THE INVENTION

The invention is directed to a display device and a method for manufacturing the same to resolve the FFE issue.

In an embodiment of the invention, a display device that includes a substrate and a color filter layer is provided. A plurality of sub-pixel electrodes are formed on the substrate. The color filter layer is configured on the substrate. The color filter layer defines a plurality of color areas corresponding to the sub-pixel electrodes. Here, each of the color areas is partially overlapped with two of the sub-pixel electrodes adjacent to each other.

In an embodiment of the invention, a method for manufacturing a display device includes forming a plurality of sub-pixel electrodes on a substrate, defining a plurality of color areas on a color filter layer, and configuring the color filter layer on the substrate. Here, each of the color areas corresponds to one of the sub-pixel electrodes. Besides, each of the color areas is partially overlapped with two of the sub-pixel electrodes adjacent to each other.

In an embodiment of the invention, a display device that includes a substrate and a color filter layer is provided. A plurality of sub-pixel electrodes are formed on the substrate. The color filter layer is configured on the substrate. Besides, the color filter layer defines a plurality of color areas corresponding to the sub-pixel electrodes. Each of the color areas includes a first partial area and a second partial area. The first partial area is overlapped with a first sub-pixel electrode of the sub-pixel electrodes, the second partial area is overlapped with a second sub-pixel electrode of the sub-pixel electrodes, and the second sub-pixel electrode is adjacent to the first sub-pixel electrode.

According to an embodiment of the invention, a shape of each of the color areas conforms to a fringe field distribution range of the corresponding sub-pixel electrode.

According to an embodiment of the invention, a shape of each of the color areas is different from a shape of the corresponding sub-pixel electrode.

According to an embodiment of the invention, each of the color areas further includes a third partial area. The third partial area is overlapped with a third sub-pixel electrode of the sub-pixel electrodes, and the third sub-pixel electrode is adjacent to the first sub-pixel electrode.

To sum up, it is not necessary to reduce the area of the sub-pixel electrodes according to the embodiments of the invention. In other words, the area of the sub-pixel electrodes can be expanded as much as possible, and the aperture ratio of the sub-pixels can be increased. Each of the color areas of the color filter layer is partially overlapped with two of the sub-pixel electrodes adjacent to each other. Therefore, notwithstanding the FFE on the sub-pixels, the unexpected color light leakage can be prevented to a great extent according to the embodiments of the invention. Accordingly, based on the above embodiments, the issue of FFE can be resolved, and color saturation can be improved.

Other features and advantages of the invention will be further understood from the further technological features disclosed by the embodiments of the invention wherein there are shown and described embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
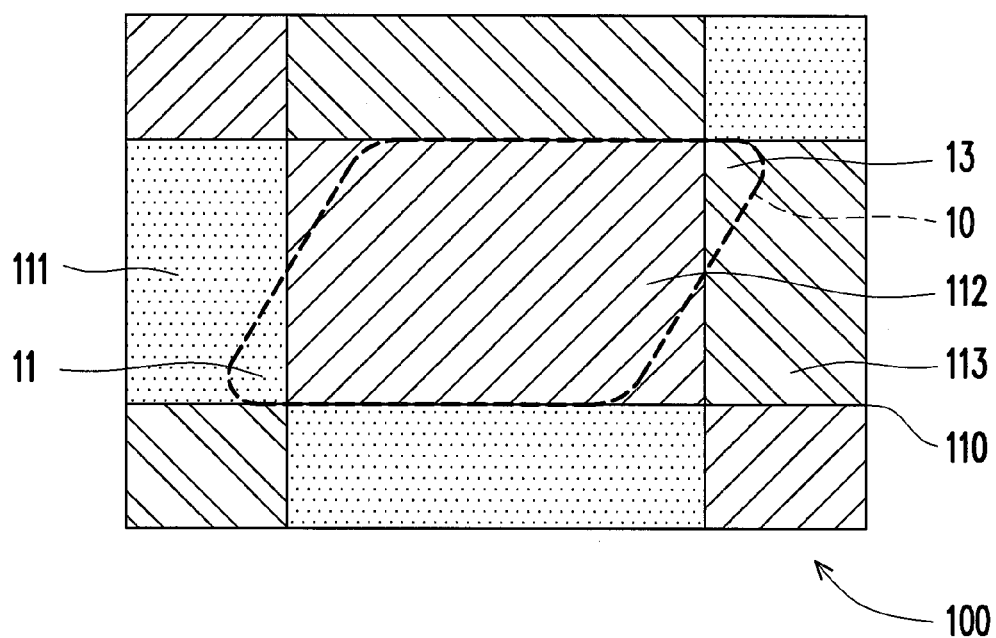
FIG. 1A is a schematic partial top view illustrating a sub-pixel array in a conventional display device.
Figure 1B:
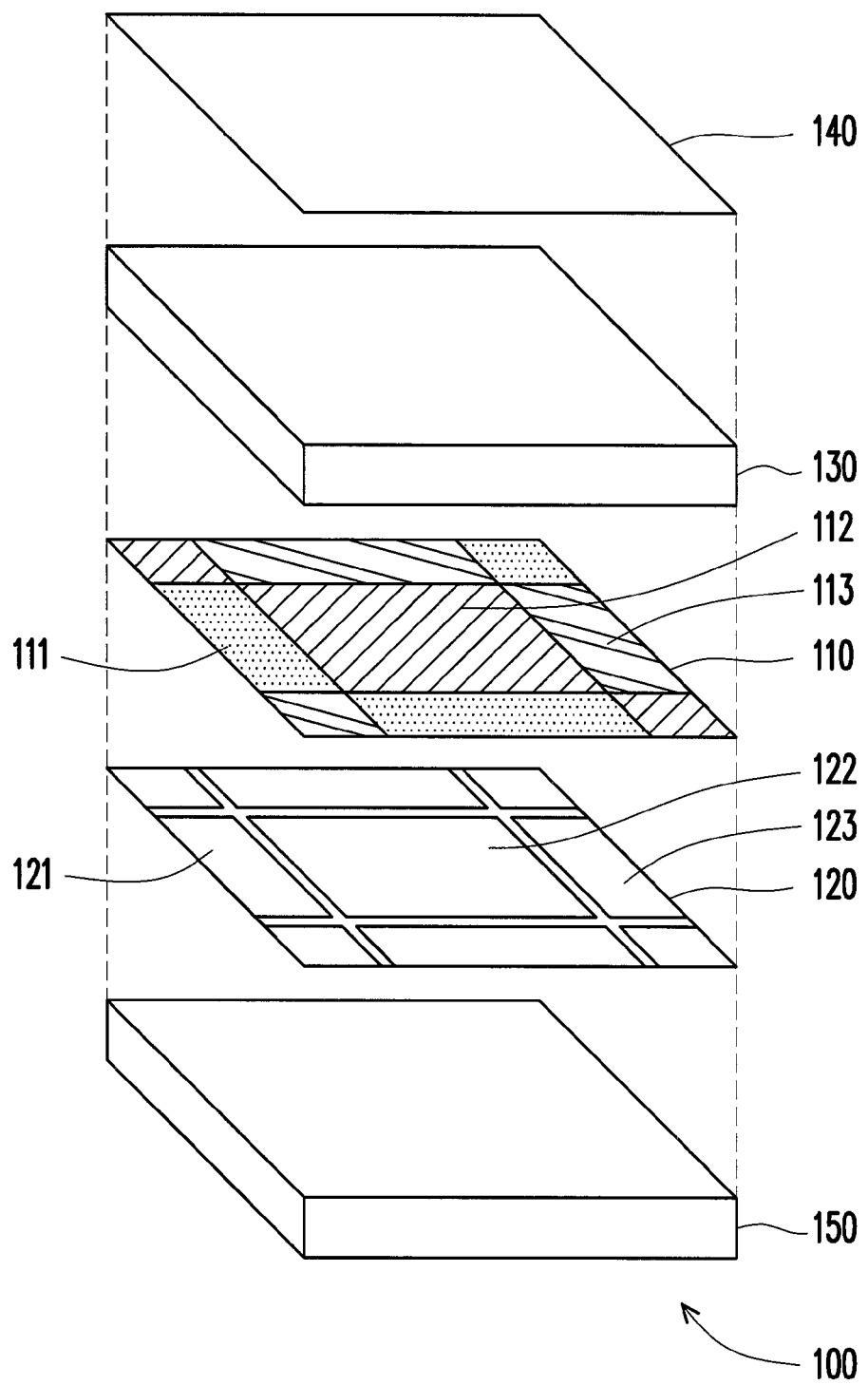
FIG. 1B is a schematic explosive view illustrating the sub-pixel array depicted in FIG. 1A.
Figure 2:
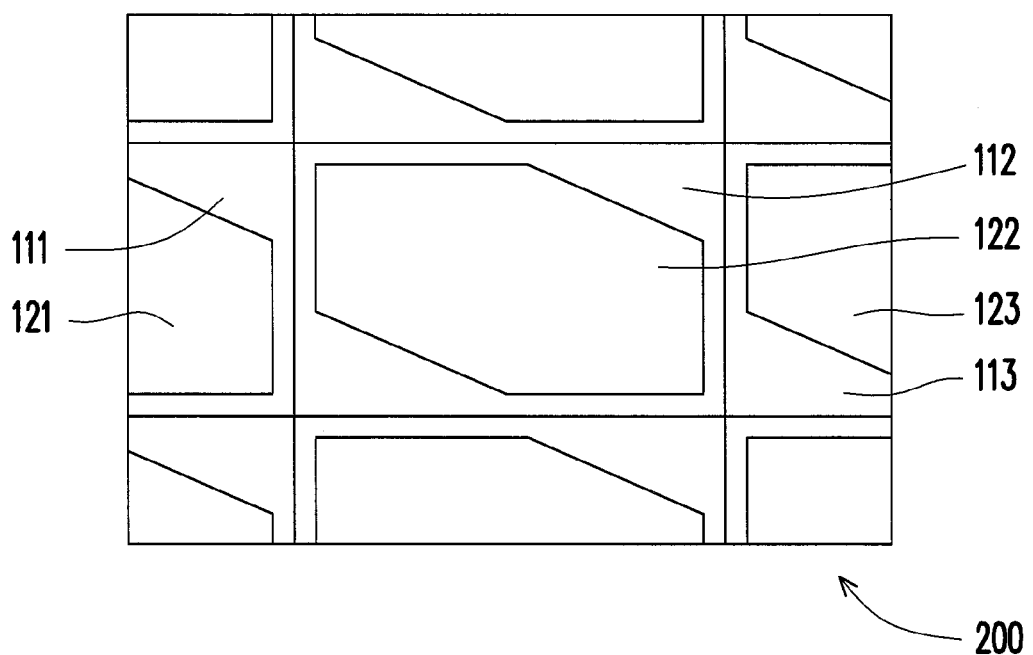
FIG. 2 is a schematic partial top view illustrating a sub-pixel array in a conventional display device.
Figure 3A:
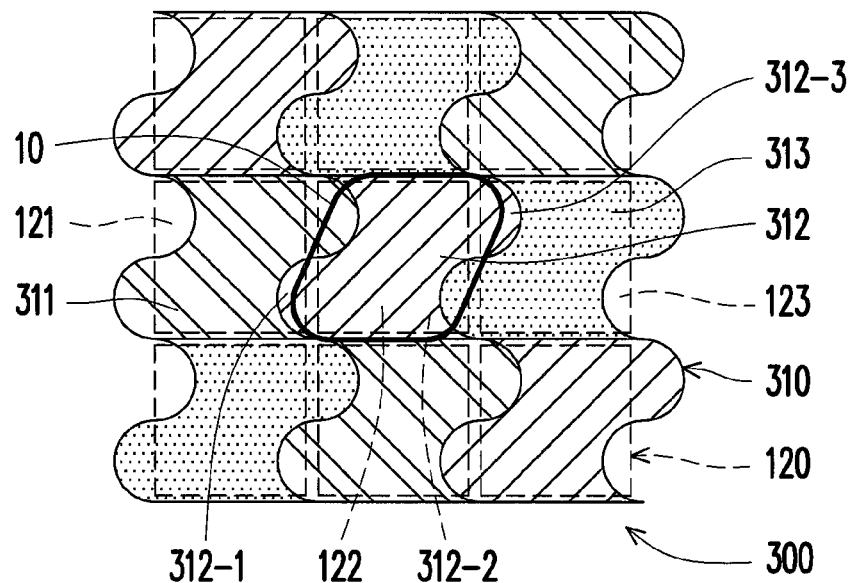
FIG. 3A is a schematic partial top view illustrating a sub-pixel array of a display device according to an embodiment of the invention.
Figure 3B:
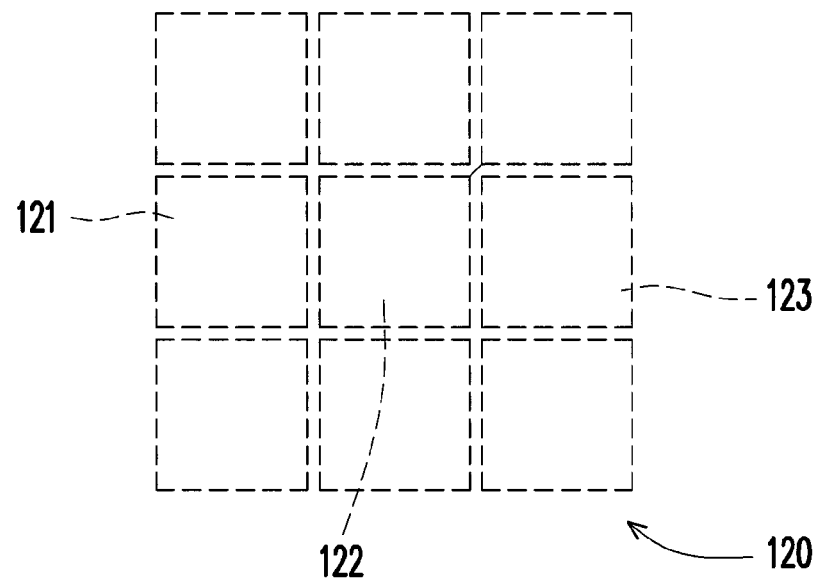
FIG. 3B is a schematic partial top view illustrating the sub-pixel electrode layer depicted in FIG. 3A.
Figure 3C:
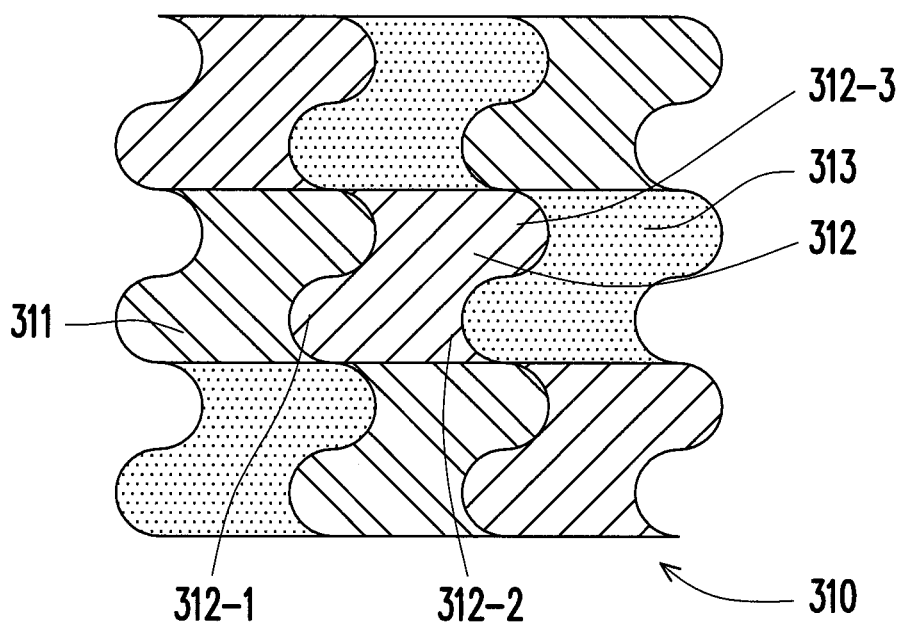
FIG. 3C is a schematic partial top view illustrating the color filter layer depicted in FIG. 3A.

FIG. 3A is a schematic partial top view illustrating a sub-pixel array of a display device 300 according to an embodiment of the invention. FIG. 3B is a schematic partial top view illustrating the sub-pixel electrode layer 120 depicted in FIG. 3A. FIG. 3C is a schematic partial top view illustrating the color filter layer 310 depicted in FIG. 3A. The display device 300 can be a liquid crystal on silicon (LCOS) display device or any other display panel that has the color filter layer. The descriptions of the sub-pixel electrode layer 120 and other components of the display device 300 in FIG. 3A can be referred to as the descriptions of the display device 100 in FIG. 1. The difference between the display devices 100 and 300 lies in the color filter layer 310 of the display device 300. Specifically, the display device 300 includes a substrate and the color filter layer 310. A plurality of sub-pixel electrodes (e.g., sub-pixel electrodes 121, 122, and 123) of the sub-pixel electrode layer 120 are formed on the substrate. The sub-pixel electrodes are rectangular, and the distance between the adjacent sub-pixel electrodes can be as short as possible. In general, the distance between the adjacent sub-pixel electrodes is subject to the design rules.

After the layout of the sub-pixel electrodes is determined, the sub-pixel electrodes can be driven in a simulative manner or in a practical manner, so as to inspect/film the fringe field distribution range/shape of the sub-pixel electrodes (e.g., the fringe field distribution range 10 in FIG. 3A). After the fringe field distribution range of the sub-pixel electrodes is obtained, the layout of the color filter layer 310 can be determined based on the fringe field distribution range. For instance, as indicated in FIG. 3A, the color filter layer 310 is configured on the substrate. Besides, the color filter layer 310 defines a plurality of color areas corresponding to the sub-pixel electrodes. For instance, the color areas 311, 312, and 313 respectively correspond to the sub-pixel electrodes 121, 122, and 123. Since the fringe field distribution range (e.g., the fringe field distribution range 10 in FIG. 3) of the sub-pixel electrode 122 is already obtained in this embodiment, the shape of the color area 312 can be correspondingly determined in conformity with the fringe field distribution range 10 of the corresponding sub-pixel electrode 122.

Here, each of the color areas is partially overlapped with two adjacent sub-pixel electrodes. For instance, the color area 312 is partially overlapped with the adjacent sub-pixel electrodes 121 and 122. That is to say, the color area 312 includes partial areas 312-1 and 312-2. The partial area 312-2 is overlapped with the sub-pixel electrode 122, and the partial area 312-1 is overlapped with the sub-pixel electrode 121 adjacent to the sub-pixel electrode 122. In this embodiment, the color area 312 further includes a partial area 312-3. The partial area 312-3 is overlapped with the sub-pixel electrode 123 adjacent to the sub-pixel electrode 122. Hence, the shape of the color area 312 is different from the shape of the corresponding sub-pixel electrode 122.

It is assumed that the color areas 311, 312, and 313 are red, green, and blue areas. The fringe field distribution range 10 shown in FIG. 3A not only drives the liquid crystal in a region where the sub-pixel electrode 122 is located but also drives liquid crystal in a partial region where the sub-pixel electrodes 121 and 123 are located. The color area 312 is partially overlapped with two adjacent sub-pixel electrodes. For instance, as indicated in FIG. 3A, the partial liquid crystal region where the sub-pixel electrodes 121 and 123 are located is affected by the fringe field distribution range 10 and is covered by the partial areas 312-1 and 312-3 of the color area 312. The arrangement of the partial areas 312-1 and 312-3 of the color area 312 is conducive to reduction of unexpected color light leakage (red and blue light) within the fringe field distribution range 10, so as to resolve the issue of FFE and improve the display performance as well as color saturation of the display device 300.

Figure 4A:
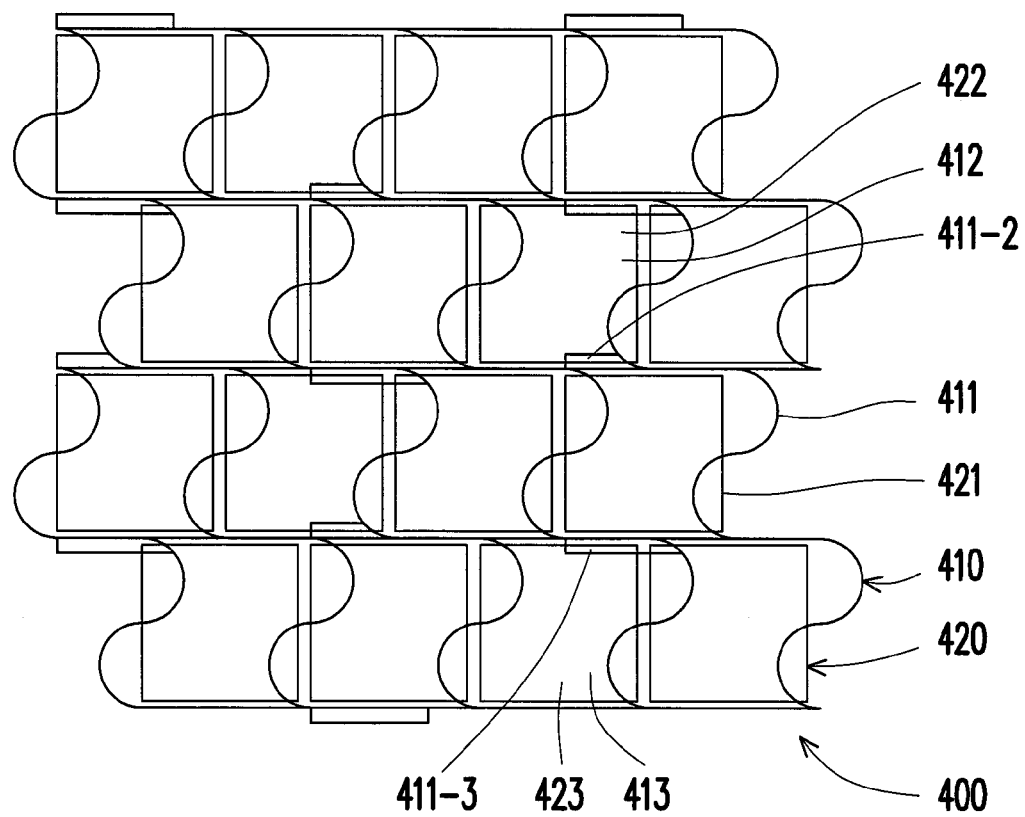
FIG. 4A is a schematic partial top view illustrating a sub-pixel array of a display device according to another embodiment of the invention.
Figure 4B:
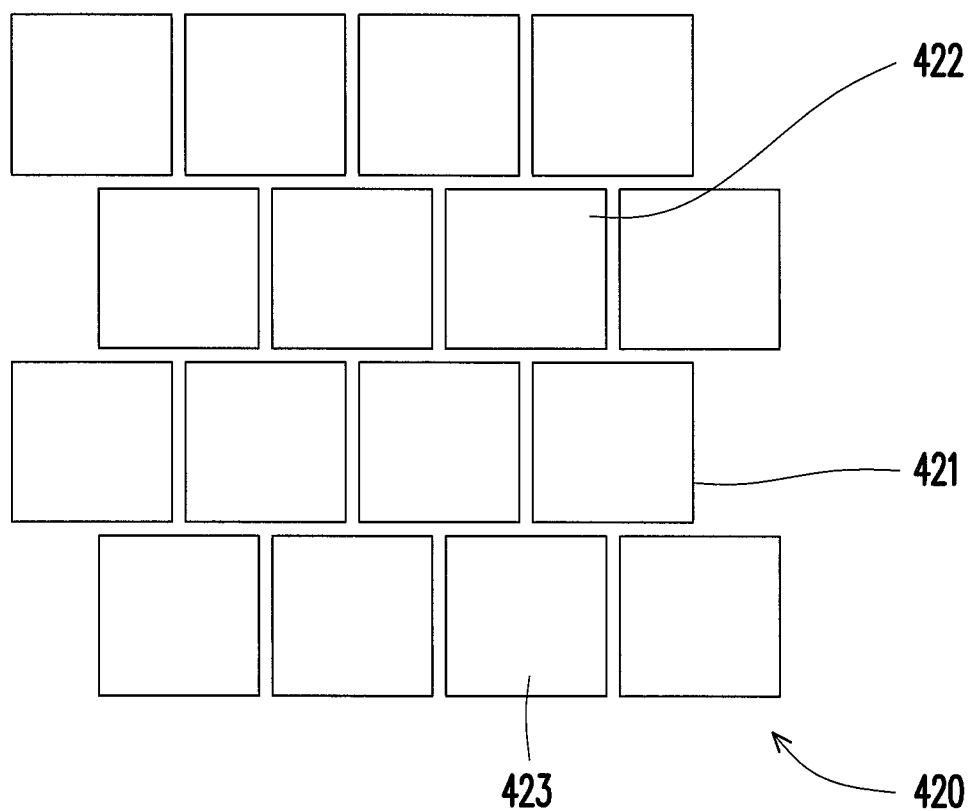
FIG. 4B is a schematic partial top view illustrating the sub-pixel electrode layer depicted in FIG. 4A.
Figure 4C:
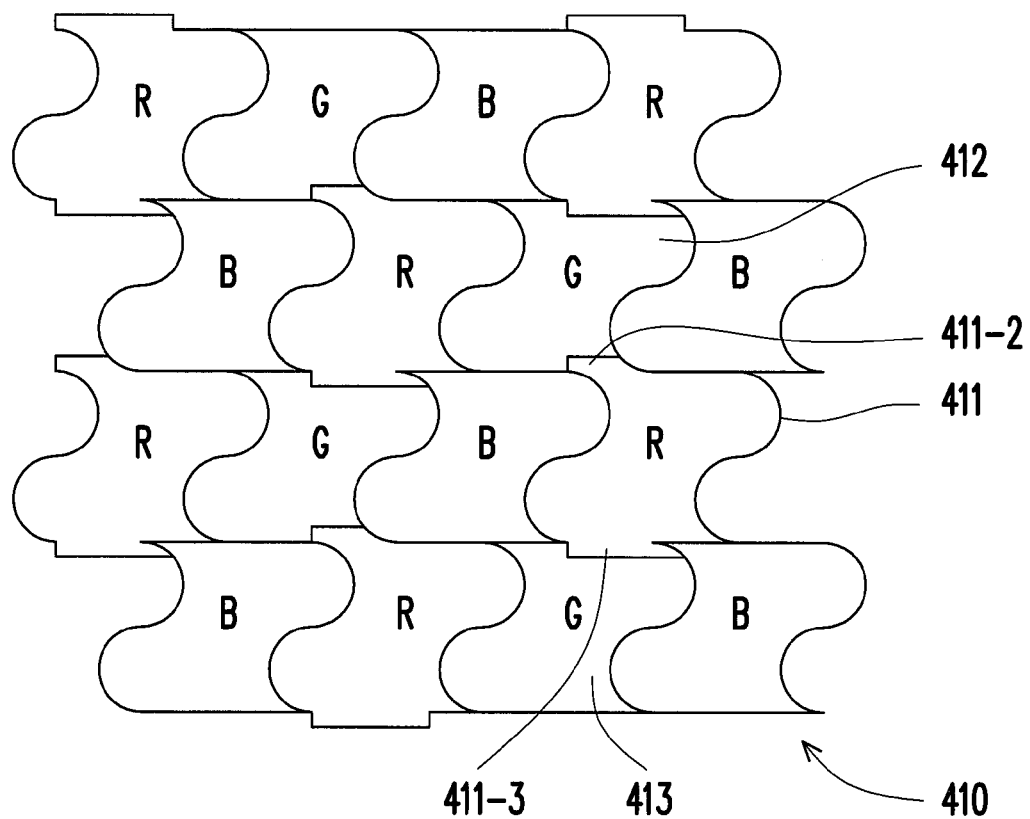
FIG. 4C is a schematic partial top view illustrating the color filter layer depicted in FIG. 4A.

FIG. 4A is a schematic partial top view illustrating a sub-pixel array of a display device 400 according to another embodiment of the invention. FIG. 4B is a schematic partial top view illustrating the sub-pixel electrode layer 420 depicted in FIG. 4A. FIG. 4C is a schematic partial top view illustrating the color filter layer 410 depicted in FIG. 4A. The descriptions of the display device 400 in FIG. 4A can be referred to as the descriptions of the display device 300 in FIG. 3A. The difference between the display devices 300 and 400 lies in that the sub-pixel electrodes of the display device 400 are arranged in a triangular (or delta) manner.

Besides, unlike the display device 300, the display device 400 has the color filter layer 410 in which the color area 411 further includes partial areas 411-2 and 411-3. The partial area 411-2 is overlapped with the sub-pixel electrode 422 adjacent to the sub-pixel electrode 421, and the partial area 411-3 is overlapped with the sub-pixel electrode 423 adjacent to the sub-pixel electrode 421. By changing the measure of the partial areas 411-2 and 411-3, the color temperature of the display device 400 can be adjusted. For instance, the color area 411 is red, and the color areas 412 and 413 are green. At this time, the partial areas 411-2 and 411-3 can increase the red component in the light spectrum, and decrease the green component in the light spectrum.

Figure 5:
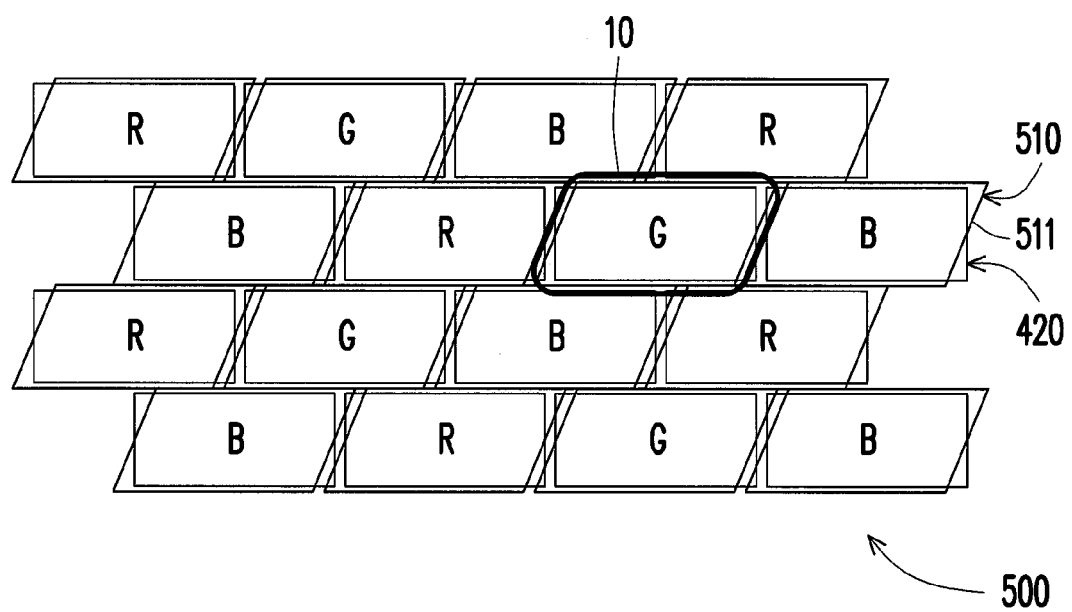
FIG. 5 is a schematic partial top view illustrating a sub-pixel array of a display device according to still another embodiment of the invention.

If the fringe field distribution range 10 of the display device has a rhombus-like shape, a plurality of rhombus-shaped color areas are defined on the color filter layer. For instance, please refer to FIG. 5. Specifically, FIG. 5 is a schematic partial top view illustrating a sub-pixel array of a display device 500 according to still another embodiment of the invention. The descriptions of the display device 500 in FIG. 5 can be referred to as the descriptions of the display devices 300 and 400 respectively in FIG. 3A and FIG. 4A. The difference between the display devices 400 and 500 lies in that the color areas (e.g., the color area 511) of the color filter layer 510 in the display device 500 have the rhombus-shaped arrangement.

Figure 6A:
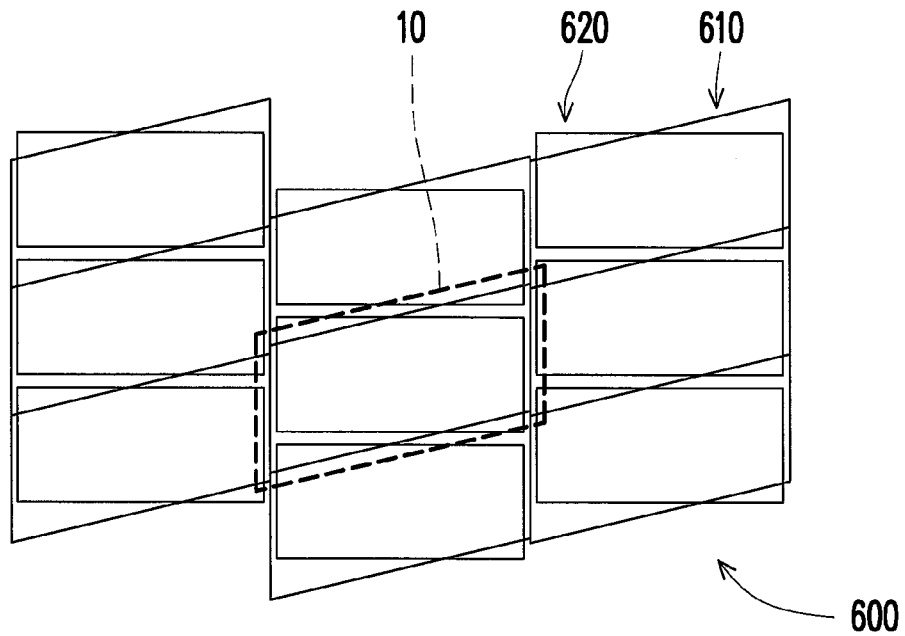
FIG. 6A is a schematic partial top view illustrating a sub-pixel array of a display device according to another embodiment of the invention.
Figure 6B:
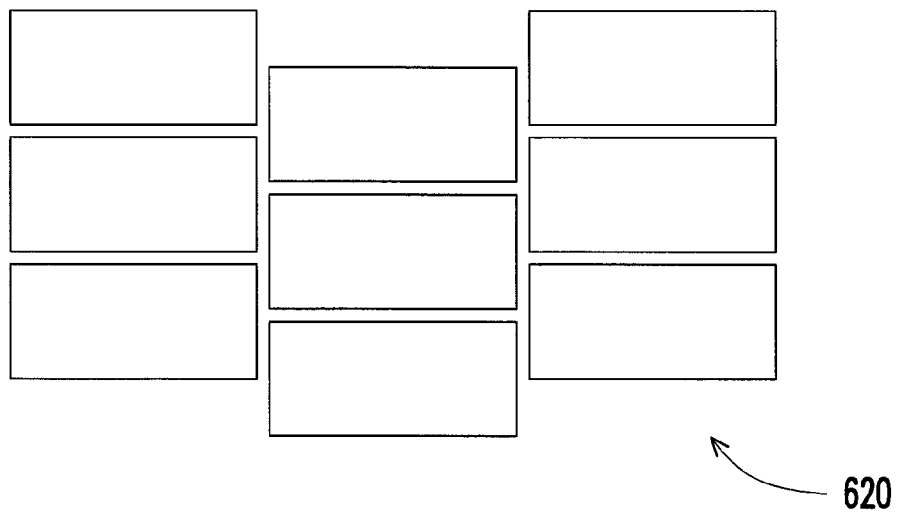
FIG. 6B is a schematic partial top view illustrating the sub-pixel electrode layer depicted in FIG. 6A.
Figure 6C:
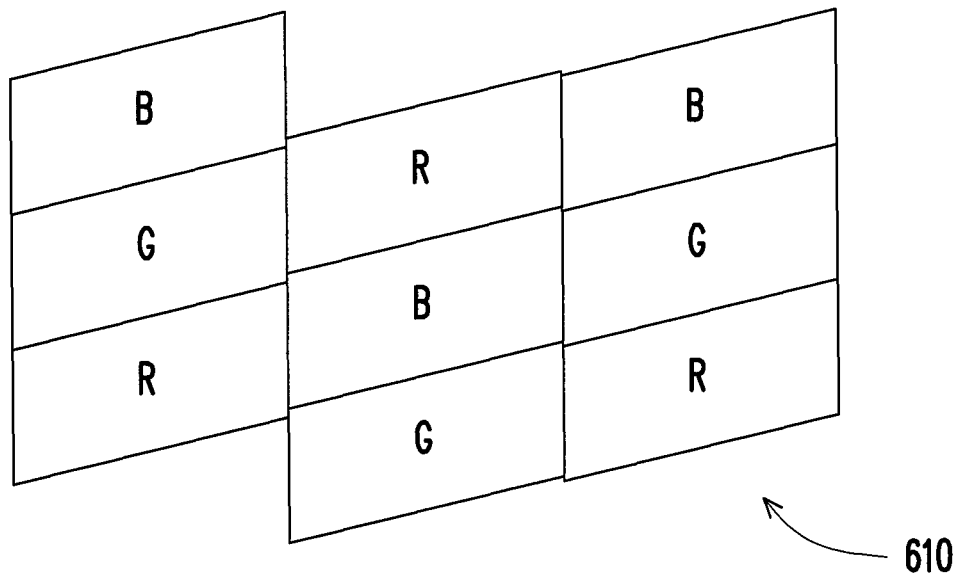
FIG. 6C is a schematic partial top view illustrating the color filter layer depicted in FIG. 6A.

FIG. 6A is a schematic partial top view illustrating a sub-pixel array of a display device 600 according to another embodiment of the invention. FIG. 6B is a schematic partial top view illustrating the sub-pixel electrode layer 620 depicted in FIG. 6A. FIG. 6C is a schematic partial top view illustrating the color filter layer 610 depicted in FIG. 6A. The descriptions of the display device 600 in FIG. 6A can be referred to as the descriptions of the display devices 300 and 400 respectively in FIG. 3A and FIG. 4A. The difference between the display devices 300 and 600 lies in that the sub-pixel electrodes in the sub-pixel electrode layer 620 of the display device 600 are arranged in a triangular (or delta) manner.

Besides, unlike the display device 300, the display device 600 has the fringe field distribution range 10 in a rhombus-like shape. After the fringe field distribution range 10 of the sub-pixel electrodes is obtained, the layout of the color filter layer 610 can be determined based on the fringe field distribution range 10. For instance, each of the color areas of the color filter layer 610 is correspondingly designed to have a rhombus shape, as indicated in FIG. 6A and FIG. 6C, such that the shape of each color area conforms to the corresponding fringe field distribution range 10.

Figure 7:
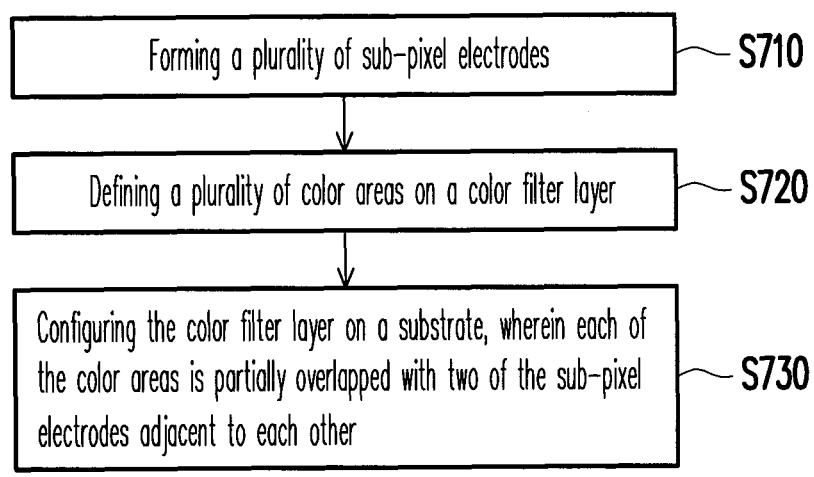
FIG. 7 illustrates a method for manufacturing a display device according to an embodiment of the invention.

FIG. 7 illustrates a method for manufacturing a display device according to an embodiment of the invention. In step S710, a plurality of sub-pixel electrodes are formed on a substrate. In step S720, a plurality of color areas are defined on a color filter layer. Here, each of the color areas corresponds to one of the sub-pixel electrodes. In step S730, the color filter layer is configured on the substrate. Here, each of the color areas is partially overlapped with two of the sub-pixel electrodes adjacent to each other.

According to other embodiments of the invention, prior to the step S710, the method for manufacturing the display device further includes a pre-step of providing a fringe field distribution range of each of the sub-pixel electrodes. Here, the shape of each of the color areas conforms to the fringe field distribution range of the corresponding sub-pixel electrode.

In light of the foregoing, as described in the embodiments of the invention, the shape of each color area in the color filter layer conforms to the fringe field distribution range of the corresponding sub-pixel electrode, such that each color area of the color filter layer is partially overlapped with two adjacent sub-pixel electrodes. Thus, notwithstanding the FFE on the sub-pixels, the unexpected color light leakage can be prevented to a great extent due to the arrangement of color areas described in the embodiments of the invention. As a result, in view of above embodiments, the issue of FFE can be resolved, and color saturation can be improved.

Although the invention has been described with reference to the above embodiments, it will be apparent to one of the ordinary skill in the art that modifications to the described embodiments may be made without departing from the spirit of the invention. Accordingly, the scope of the invention will be defined by the attached claims rather than by the above detailed descriptions.

What is claimed is:

1. A display device comprising:
    a substrate having a plurality of sub-pixel electrodes formed thereon; and
    a color filter layer configured on the substrate, the color filter layer defining a plurality of color areas, each of the color areas corresponding to one of the sub-pixel electrodes,
    wherein each of the color areas is partially overlapped with two of the sub-pixel electrodes adjacent to each other.

2. The display device as recited in claim 1, wherein a shape of each of the color areas conforms to a fringe field distribution range of the corresponding one of the sub-pixel electrodes.

3. The display device as recited in claim 1, wherein a shape of each of the color areas is different from a shape of the corresponding one of the sub-pixel electrodes.

4. A method for manufacturing a display device, the method comprising:
    forming a plurality of sub-pixel electrodes on a substrate;
    defining a plurality of color areas on a color filter layer, each of the color areas corresponding to one of the sub-pixel electrodes; and
    configuring the color filter layer on the substrate, wherein each of the color areas is partially overlapped with two of the sub-pixel electrodes adjacent to each other.

5. The method as recited in claim 4, further comprising:

providing a fringe field distribution range of each of the sub-pixel electrodes, wherein a shape of each of the color areas conforms to the fringe field distribution range of the corresponding one of the sub-pixel electrodes.

6. A display device comprising:

a substrate having a plurality of sub-pixel electrodes formed thereon; and a color filter layer configured on the substrate, the color filter layer defining a plurality of color areas corresponding to the sub-pixel electrodes, wherein each of the color areas comprises a first partial area and a second partial area, the first partial area is overlapped with a first sub-pixel electrode of the sub-pixel electrodes, the second partial area is overlapped with a second sub-pixel electrode of the sub-pixel electrodes, and the second sub-pixel electrode is adjacent to the first sub-pixel electrode.

7. The display device as recited in claim 6, wherein each of the color areas further comprises a third partial area, the third partial area is overlapped with a third sub-pixel electrode of the sub-pixel electrodes, and the third sub-pixel electrode is adjacent to the first sub-pixel electrode.

* * * * *